(12) United States Patent
Chen et al.

(10) Patent No.: US 9,166,316 B2
(45) Date of Patent: Oct. 20, 2015

(54) DATA STORAGE CONNECTING DEVICE

(71) Applicant: Super Micro Computer Inc., San Jose, CA (US)

(72) Inventors: Richard S. Chen, San Jose, CA (US); Lawrence H. Liang, San Jose, CA (US); Lawrence K. W. Lam, San Jose, CA (US); Shen Ping, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 109 days.

(21) Appl. No.: 14/072,596

(22) Filed: Nov. 5, 2013

(65) Prior Publication Data

US 2015/0126048 A1 May 7, 2015

(51) Int. Cl.
*H01R 11/00* (2006.01)
*H01R 12/72* (2011.01)
*G11B 25/00* (2006.01)
*H01R 27/02* (2006.01)

(52) U.S. Cl.
CPC .............. *H01R 12/724* (2013.01); *G11B 25/00* (2013.01); *H01R 27/02* (2013.01)

(58) Field of Classification Search
CPC ....................................................... H01R 31/06
USPC ..................................... 439/492, 498, 502, 71
See application file for complete search history.

(56) References Cited

U.S. PATENT DOCUMENTS

| 6,630,625 | B1 * | 10/2003 | Akashi et al. | 174/72 A |
| 6,733,325 | B2 * | 5/2004 | Sakai et al. | 439/495 |
| 7,186,151 | B2 * | 3/2007 | Komiyama | 439/701 |
| 7,281,953 | B1 * | 10/2007 | Jochym et al. | 439/638 |
| 8,876,064 | B2 * | 11/2014 | Seifert et al. | 244/208 |
| 8,878,064 | B2 * | 11/2014 | Chien et al. | 174/113 R |
| 2010/0112850 | A1 * | 5/2010 | Rao et al. | 439/492 |

* cited by examiner

*Primary Examiner* — Phuong Dinh
(74) *Attorney, Agent, or Firm* — Chun-Ming Shih; HDLS IPR Services

(57) ABSTRACT

A data storage connecting device includes a circuit board, a first connector, a second connector and a third connector. The circuit board has a first connecting end and a second connecting end. The first connector and a second connector are both disposed on the first connecting end and respectively at two sides of a long axis of the circuit board, a location of the second connector connecting with a data storage device being opposite to that of the first connector connecting with another data storage device. The third connector is disposed on the second connecting end for transmitting data from two data storage devices connected to the first connector and the second connector, respectively, via the circuit to a server device, or vice versa.

8 Claims, 6 Drawing Sheets

DATA STORAGE CONNECTING DEVICE

BACKGROUND OF THE INVENTION

1. Field of the Invention

The present invention generally relates to a data storage connecting device, and more particularly to a connecting device capable of connecting multiple data storage devices to a server system for data transmitting purpose.

2. Description of Related Art

Nowadays, the high-performance, high-efficiency server technology plays a tremendous role in the Network or Cloud Computing industry. Among other things, the quality, quantity, and speed of data access become the most important issue to determine the performance of any server or cloud technology. The more hard drives or storage device can be accessed, the more powerful the server system could be. Generally speaking, the server device or system is a relay station for transmitting or accessing data in the network, so the configuration of the server device need to be well designed, and the following factors listed below indicates certain issue currently be faced:

(1) The traditional configuration of server system requires a hard drive electrically connecting to a connecting board or a data bus cable to the main motherboard. Under this one to one connection (one hard drive to one connector/cable), multiple hard drives or storage devices will be required to correspond to multiple connecting boards or data bus cables, in which it will occupy a significant amount of space in the server system. Further the component cost will be higher due to such redundant connecting boards or data bus cables.

(2) In the prior art, the transmitting distance may vary due to the displacement between multiple hard drive or storage devices with corresponding connecting boards or bus cables. The discrepancy of transmitting always causes the trouble of signal synchronization, and even signal lost issue if some signals travel for long distance.

(3) As aforesaid, the volume for multiples connecting boards or data bus cables in a server system will further cause the space issue as well. In the event the server design requires a compact space without changing the original configuration, a room for dissipating heat has to be reduced, and the problem of heat-dissipation will occur inevitably. As the server system works in high-speed calculation process with bad heat-dissipation efficiency, the system crash is very possibly to happen, and in any event, may cause the entire network or cloud connection shut down.

Accordingly, how to develop a data storage connecting device in order to solve the above problems is an important issue to the people skilled in the art.

SUMMARY OF THE INVENTION

In one aspect, the present invention is to provide a data storage connecting device in order to make the distances of multiple connectors connecting with a single transmission connector are equal, so signal loss or signal discrepancy caused by a data storage device connecting to one of the multiple connectors being located far away may be avoided.

In another aspect, the present invention is to provide a data storage connecting device in order to simplify the prior configuration of multiple transmission connectors electrically connecting with multiple storage devices as the present configuration of only one single transmission connector electrically connecting with multiple storage devices. That is, single transmission connector is needed to complete the works of connecting multiple data storage devices for transmitting data to a server device or receiving data from the server device.

In still another aspect, the present invention is to provide a data storage having a circuit board shaped as a letter of capital I, so a tray can be designed with one or more hollow portions to enhance thermal convection efficiency and heat dissipation effect when the circuit board is disposed in the tray.

Accordingly, a data storage connecting device provided by the present invention includes a circuit board, a first connector, a second connector and a third connector. The circuit board has a first connecting end and a second connecting end. The first connector and a second connector are both disposed on the first connecting end and respectively at two sides of a long axis of the circuit board, a location of the second connector connecting with a data storage device being opposite to that of the first connector connecting with another data storage device. The third connector having a first storing unit pin set and a second storing unit pin set is disposed on the second connecting end for transmitting data from two data storage devices connected to the first connector and the second connector, respectively, via the circuit to a server device, or vice versa.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
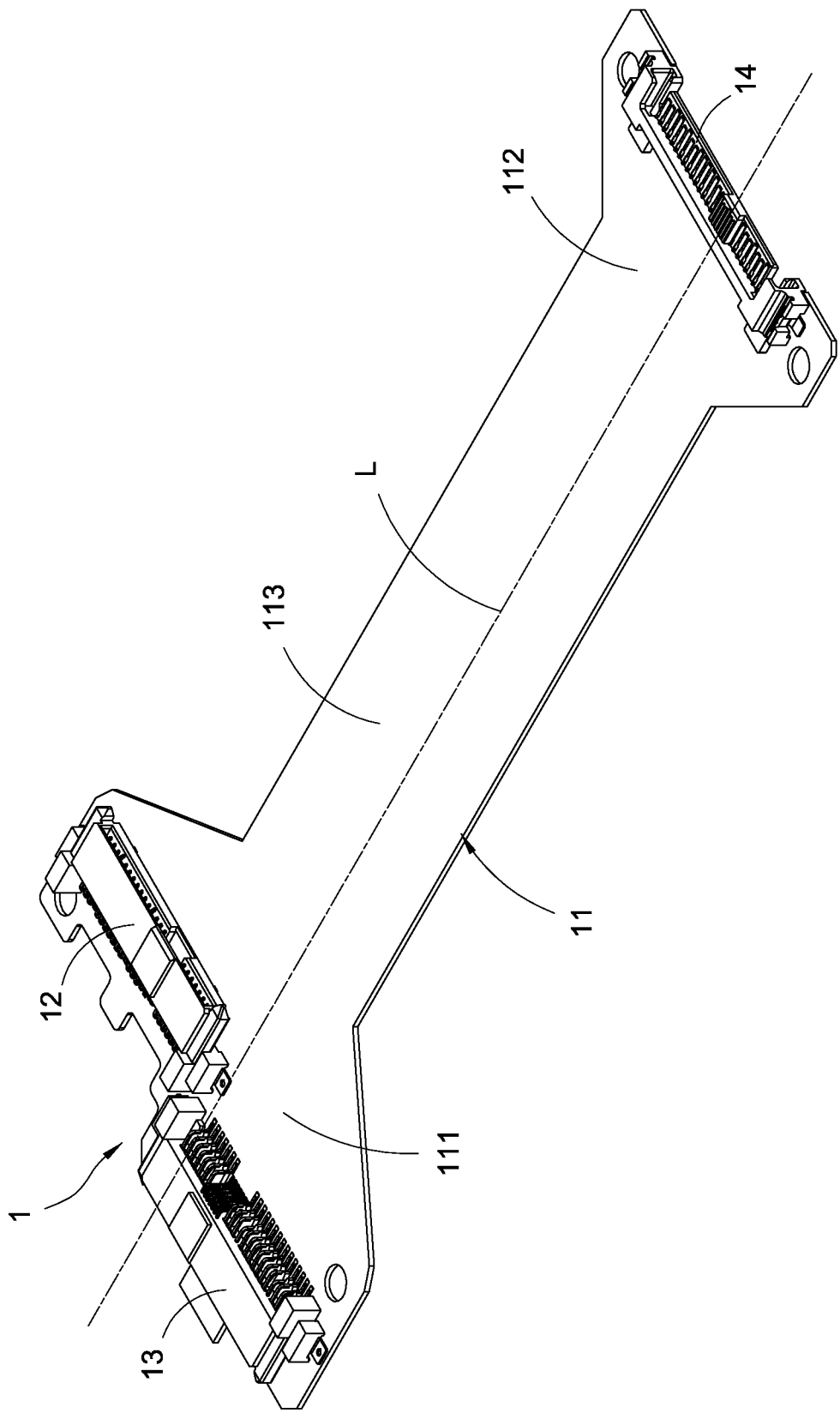
FIG. 1 illustrates a schematic perspective view of a data storage connecting device according to one preferred embodiment of the present invention.

Please refer to FIG. 1, which illustrates a schematic perspective view of a data storage connecting device. As shown in the figure, the data storage connecting device 1 comprises a circuit board 11, a first connector 12, a second connector 13 and a third connector 14.

The circuit board 11 has a first connecting end 111, a second connecting end 112, and a middle part 113 of an elongated shape formed between the first connecting end 111 and the second connecting end 112, and a width of the first connecting end 111 and a width of the second connecting end 112 are larger than a width of the middle part 113. Preferably, the circuit board 11 is shaped as a letter of capital I.

The first connector 12 and the second connector 13 are both disposed on the first connecting end 111, and respectively at two sides of a long axis L of the circuit board 11. A location of the second connector 13 connecting with a data storage device is opposite to that of the first connector 12 connecting with another data storage device. For example, as shown in FIG. 6, a data storage device B is disposed on the middle part 11 to connect with the first connector 12, and a data storage device A is disposed at a side opposite to the data storage device B to connect with the second connector 13.

The third connector 14 is disposed on the second connecting end 112 for transmitting data from two data storage devices connected to the first connector 12 and the second connector 13, respectively, via the circuit board 11 to a motherboard of a server device (not shown), or vice versa.

Figure 2:
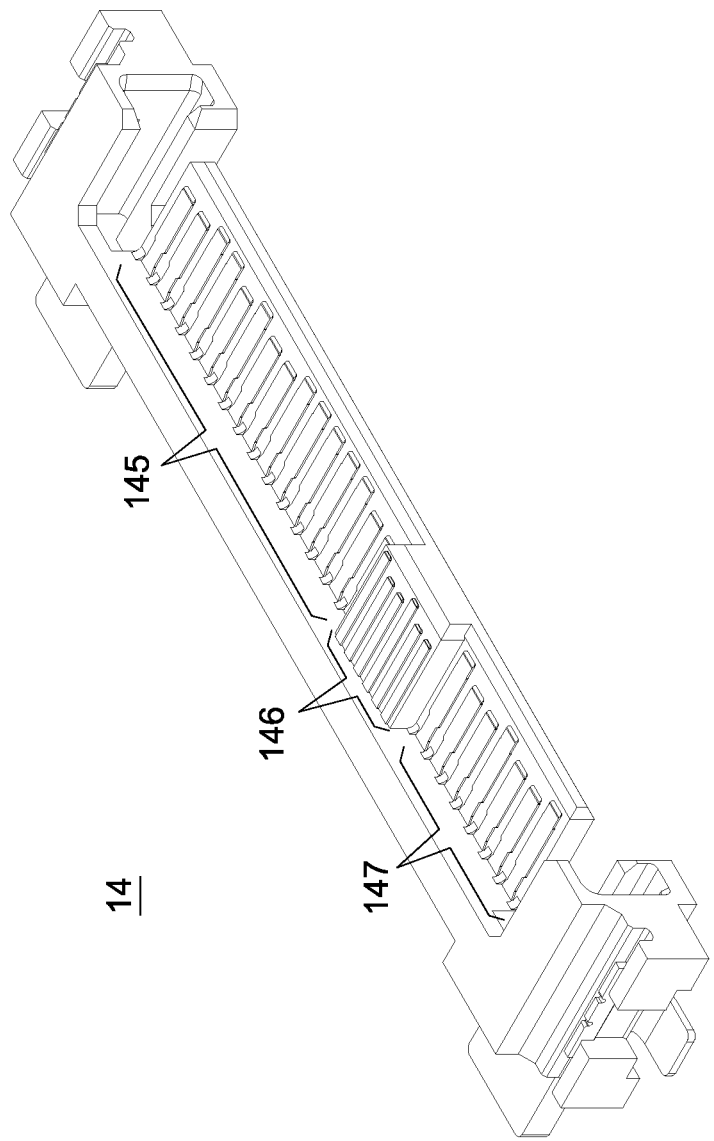
FIG. 2 illustrates a schematic top perspective view of a transmission connector of the data storage connecting device.
Figure 3:
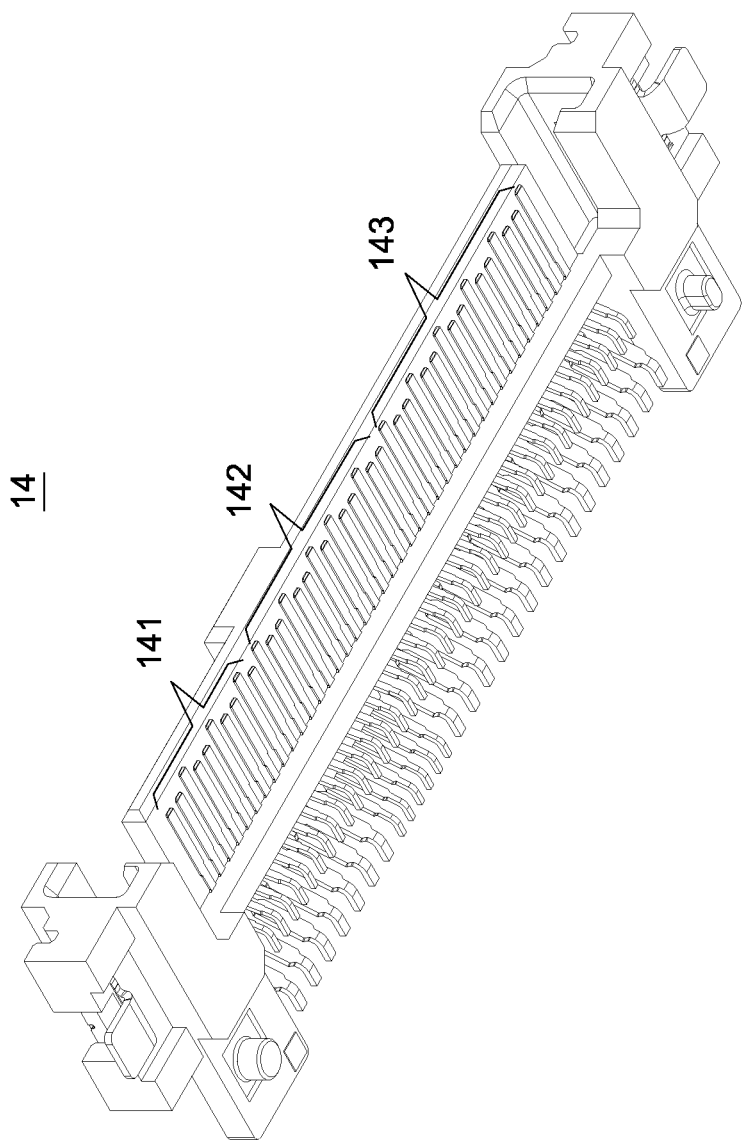
FIG. 3 illustrates a schematic bottom perspective view of a transmission connector of the data storage connecting device.
Figure 4:
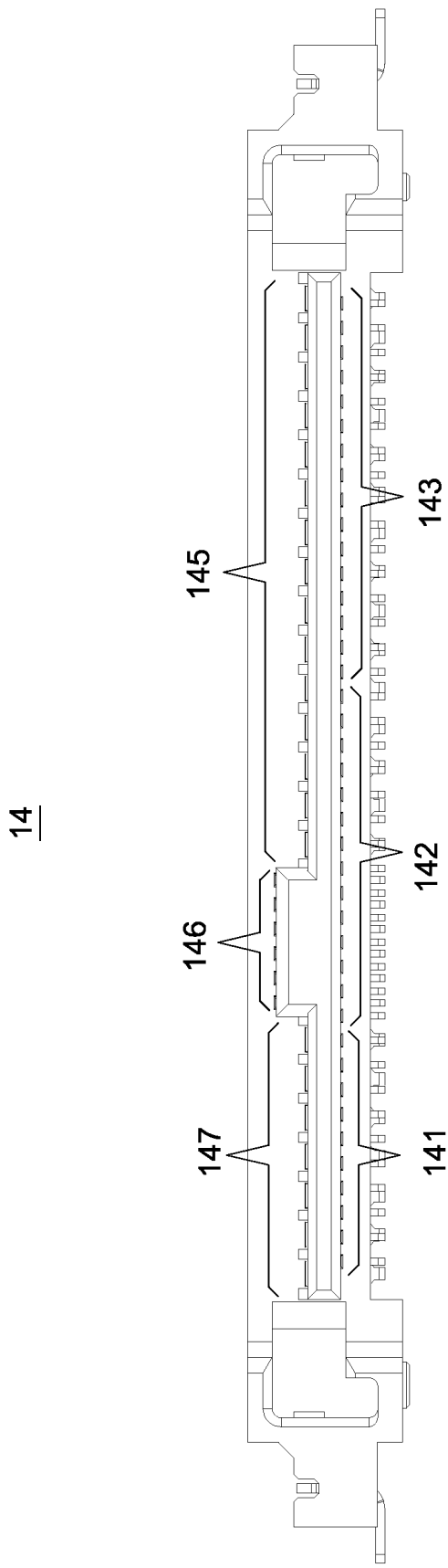
FIG. 4 illustrates a schematic front view of a transmission connector of the data storage connecting device.
Figure 5:
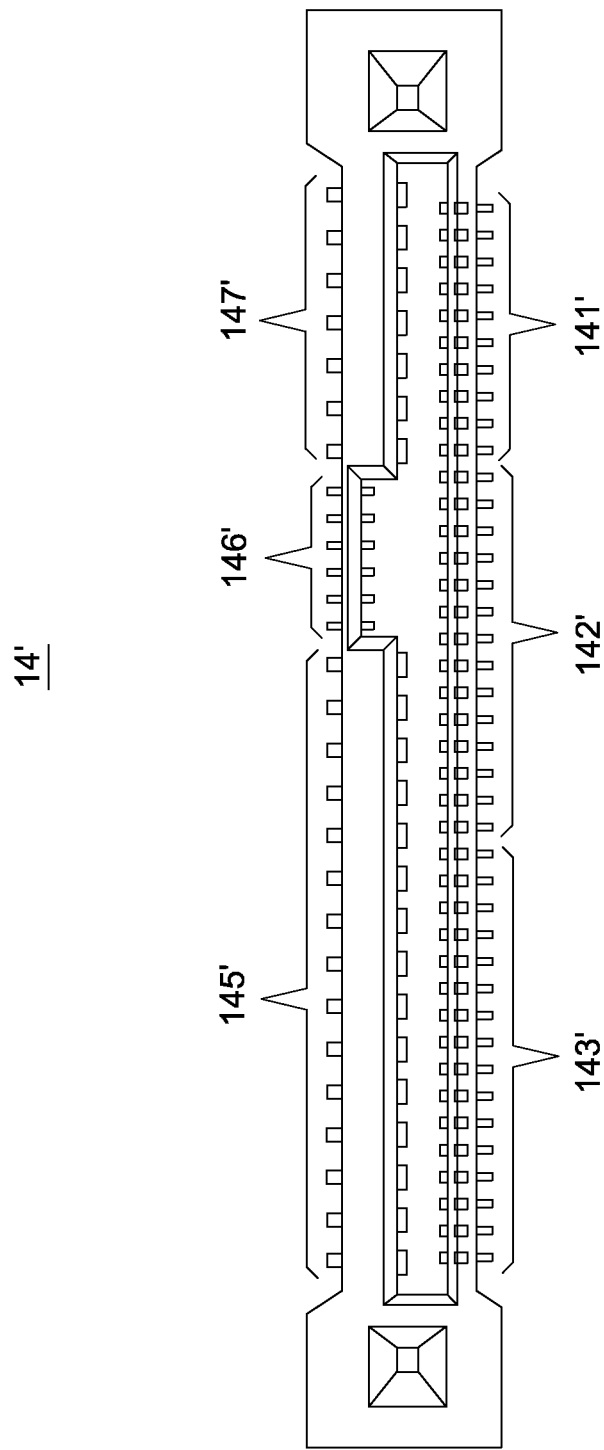
FIG. 5 illustrates a schematic assembled front view of a transmission connector of a data storage connecting device according to another preferred embodiment of the present invention.

Please be noted that the arrangement for the pins of the third connector 14 is different and has been improved while the data storage connecting device 1 of the present invention can simultaneously connect with two data storage devices. Preferably, the pins of the third connector 14 are substantially defined to comprise a power pin set, a ground pin set, a first storing unit pin set, a second storing pin set, and a mainboard pin set. These pin sets can be arranged in the third connector 14 by different ways based on demands. For example, please refer to FIG. 2, FIG. 3, and FIG. 4, which illustrate a schematic assembled perspective top view of a third connector, a schematic assembled perspective bottom view of a third connector, and a schematic assembled front view of a third connector. As shown in the figures, the third connector 14 comprises a power pin set 141, a first storing unit pin set 142, a second storing unit pin set 143, a power and ground pin set 145, a mainboard pin set 146, and a ground pin set 147 all directing away from the location of the middle part 113. More specifically, when facing the second end 112 in FIG. 1, the power pin set 141, the first storing unit pin set 142, and the second storing unit pin set 143 are arranged at the lower row of the third connector 14 from the left to the right of the third connector 14, as shown in FIG. 3; on the other hand, the power and ground pin set 145, the mainboard pin set 146, and the ground pin set 147 are arranged at the upper row of the third connector 14 from the right to the left of the third connector 14, as shown in FIG. 4. Further, referring to FIG. 6, the first storing unit pin set 142 is provided for connecting the data storage A, and the second storing unit pin set 143 is provided for connecting the data storage B. Besides, the width of each pin of the power and ground pin set 145, the mainboard pin set 146, and the ground pin set 147 in FIG. 2 is larger than the width of each pin of the power pin set 141, the first storing unit pin set 142, and the second storing unit pin set 143 in FIG. 3, since the current needed for power is greater and the current needed for transmitting data is smaller. As mentioned above, all pin sets of the third connector 14 can be arranged based on demands. In this preferred embodiment, the wider pins are required to assigned for the power needed, so the power and ground pins are disposed at the upper row. However, in other embodiments, such pin sets can be rearranged or mixed with each other based on power supply or other design demands. Referring together with FIG. 4, FIG. 5 illustrates a schematic assembled front view of another embodiment for a third connector. The third connector 14 in FIG. 4 is a male connector, the third connector 14' in FIG. 5 is a female connector, and the third connector 14' comprises a power pin set 141', a first storing unit pin set 142', a second storing unit pin set 143', a power and ground pin set 145', a mainboard pin set 146' and a ground pin set 147'.

Figure 6:
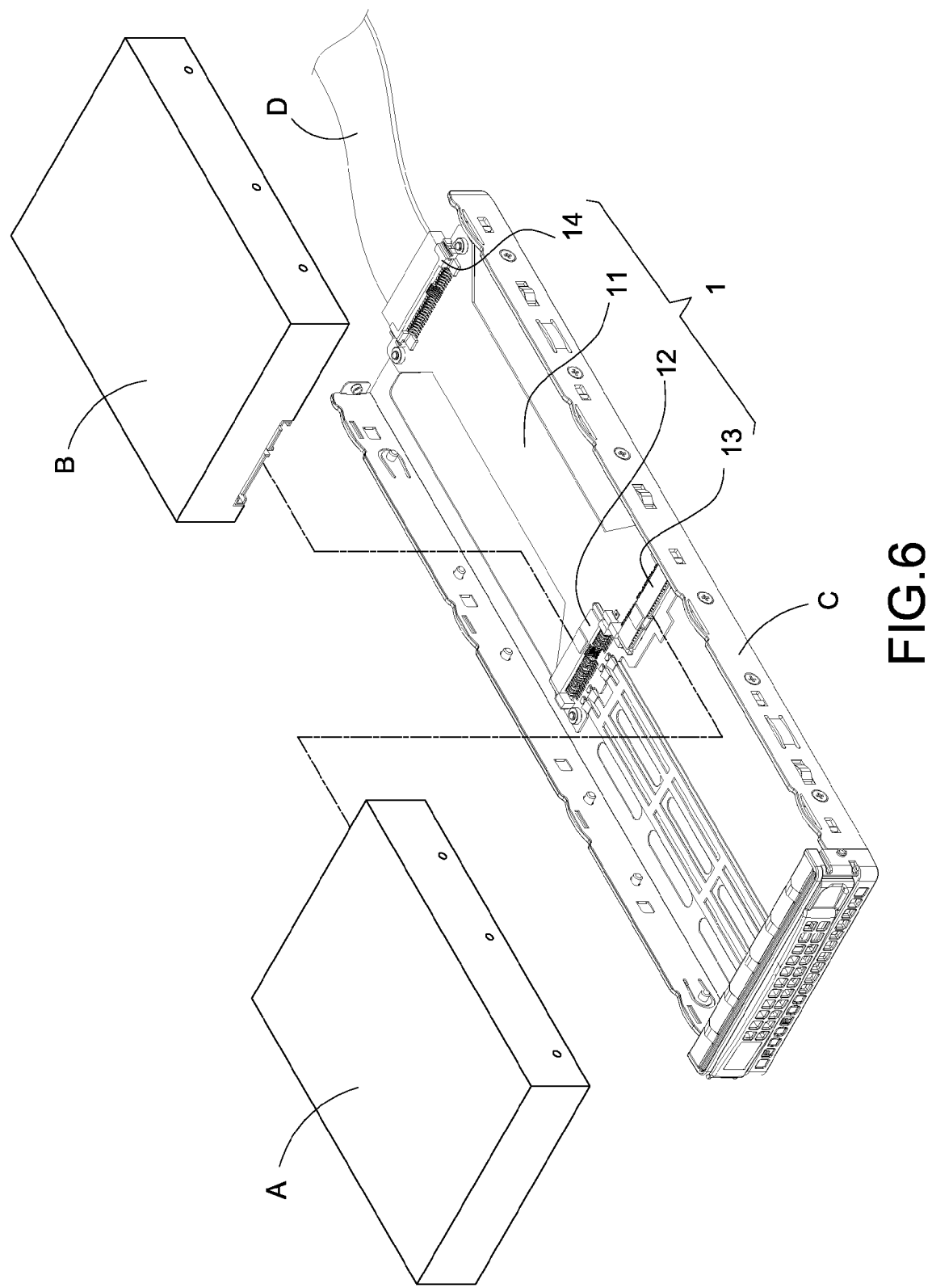
FIG. 6 illustrates an exploded perspective view for a data storage connecting device in used according to one preferred embodiment of the present invention.

Please refer to FIG. 6, which illustrates a schematic exploded perspective view of a data storage connecting device in use. As shown in the figure, the circuit board 11, the first connector 12, the second connector 13, and the third connector 14 are disposed in a tray C. The data storage device B is disposed on the middle part 11 to connect with the first connector 12, and the data storage device A is disposed on a side opposite to the data storage device B to connect with the second data storage connector 13. The third connector 14 is connected with a cable D in order to transmit data to external (i.e. motherboard of a serve device) or from the external to the data storage device B or the data storage device A.

The present invention adopts the arrangement that the first connector and the second connector are disposed at the same end of circuit board but the directions of connecting with the two data storage devices are opposite to each other. Besides, the first connector and the second connector are simultaneously connected with the third connector at the other end of the circuit board for transmitting data to the external or receiving data from the external. The advantages of the present invention are listed below.

(1) Since the first connector and the second connector are disposed at the same end of the circuit board, the distances of the first connector and the second connector from the third connector are substantially equal, so as to avoid the data signal discrepancy or signal loss in a data storage device due to the different or longer distance from the third connector.

(2) The unique configuration of the present invention can process the signals from the first connector and the second connector simultaneously, so that only one third connector can complete the operation and data transmission of the two data storage devices.

(3) Since the circuit board is shaped as a letter of capital I, so the tray can be designed for one or more hollow portions thereof to enhance thermal convection efficiency and heat dissipation effect when the circuit board is disposed in the tray.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A data storage connecting device, comprising:
a circuit board (11), having a first connecting end (111) and a second connecting end (112);
a first connector (12), disposed on the first connecting end (111);
a second connector (13), disposed on the first connecting end (111), and the first connector (12) and the second connector (13) being respectively disposed at two sides of a longitudinal axis (L) of the circuit board (11) and arranged along a transversal axis, a location of the second connector's connection with a data storage device, with respect to the transversal axis, being opposite to that of the first connector's connection with another data storage device; and
a third connector (14) comprising a first storing unit pin set (142) and a second storing unit pin set (143), disposed on the second connecting end (112) for transmitting data from two data storage devices connected to the first connector (12) and the second connector (13), respectively, via the circuit board (11) to a server device, or transmitting data from the server device to the two data storage devices connected to the first connector (12) and the second connector (13), respectively.

2. The data storage connecting device according to claim 1, wherein the circuit board (11) has a middle part of an elongated shape formed between the first connecting end and the second connecting end, and a width of the first connecting end (111) and a width of the second connecting end (112) are larger than a width of the middle part (113) of the circuit board (11).

3. The data storage connecting device according to claim 1, wherein the third connector (14) is a male connector.

4. The data storage connecting device according to claim 1, wherein the third connector (14) is a female connector.

5. The data storage connecting device according to claim 1, wherein the first storing unit pin set (142) is provided for the second connector (13).

6. The data storage connecting device according to claim 1, wherein the second storing unit pin set (143) is provided for the first connector (12).

7. The data storage connecting device according to claim 6, wherein the third connector (14) further comprises a power pin set (141), a ground pin set (147), and a power and ground pin set (145).

8. The data storage connecting device according to claim 7, wherein the third connector (14) further comprises a mainboard pin set (146).

* * * * *